United States Patent [19]

Yanagawa et al.

[11] Patent Number: 4,773,440

[45] Date of Patent: Sep. 27, 1988

[54] EXHAUST GAS BRAKE SYSTEM

[75] Inventors: Ichiro Yanagawa; Yuji Wachi, both of Higashimatsuyama, Japan

[73] Assignee: Jidosha Kiki Co., Ltd., Japan

[21] Appl. No.: 946,081

[22] Filed: Dec. 22, 1986

[30] Foreign Application Priority Data

Dec. 26, 1985 [JP] Japan ............................ 60-200086
Dec. 26, 1985 [JP] Japan ............................ 60-200087

[51] Int. Cl.$^4$ ............................ F16K 3/02; B08B 9/00

[52] U.S. Cl. .................................... 137/242; 123/323; 137/312; 188/273; 251/63.6; 251/214; 251/326; 251/329; 277/24

[58] Field of Search ...................... 251/63.5, 63.6, 214, 251/326, 329; 92/86; 277/24; 188/273; 137/242, 244, 312; 113/320; 123/323; 15/256.5

[56] References Cited

U.S. PATENT DOCUMENTS

| | | | |
|---|---|---|---|
| 3,307,574 | 3/1967 | Anderson | 137/312 |
| 3,379,405 | 4/1968 | Natho | 251/63.6 |
| 3,958,592 | 5/1976 | Wells et al. | 251/63.6 |
| 4,054,156 | 10/1977 | Benson | 251/63.6 |
| 4,205,704 | 6/1980 | Benson | 137/630.12 |
| 4,290,610 | 9/1981 | Lizogub et al. | 277/24 |
| 4,408,627 | 10/1983 | Harris | 251/63.6 |
| 4,617,955 | 10/1986 | Melgaard | 137/312 |

FOREIGN PATENT DOCUMENTS 6054643 3/1985 Japan .

*Primary Examiner*—George L. Walton
*Attorney, Agent, or Firm*—McGlew and Tuttle

[57] ABSTRACT

The present invention relates to an exhaust gas brake system of slide type for an improvement in construction that a coupler cover member has a space chamber defined in the inner circumference of a central opening thereof through which a piston rod of a pneumatic actuator extends, the space chamber communicating to the atmosphere, through which chamber exhaust gas from an engine liable to flow to the side of the actuator is guided to be discharged to the atmosphere. Also, the invention relates to such an exhaust gas brake construction that there are provided first ring means and second ring means disposed in an alternately stacked relationship one upon the other within and along the longitudinal axis of the piston rod passing opening, the first ring means having a relatively small inner circumference clearance and a relatively large outer circumference clearance, the second ring means having a relatively large inner circumference clearance and a relatively small outer circumference clearance, whereby exhaust gas is prevented from entering into the actuator and carbon is prevented from depositing onto the piston rod.

7 Claims, 3 Drawing Sheets

EXHAUST GAS BRAKE SYSTEM

BACKGROUND OF THE INVENTION 1. (i) Field of the Invention

The present invention relates to an exhaust gas brake more particularly to an improvement in or relating to the construction of a piston rod coupler in an exhaust gas brake system such that there is provided a pneumatic actuator having a piston rod inserted into the opening of a coupler member.

2. (ii) Related Art Statement

It is generally known in the related art that an exhaust brake system is generally designed to be employed mainly in a motor truck or in a bus, and this exhaust brake system is adapted, in addition to the normal wheel brake system, to close a brake valve disposed in the middle of the exhaust gas piping of the vehicle for overcoming an acceleration as arisen in the downhill operation of the vehicle, so that the vehicle's speed may be moderated. The general construction of this exhaust gas brake system is common in use as shown in FIG. 3, for example. Referring more specifically to this construction, there is shown an exhaust gas pipe, which is designated at the reference numeral 1, and through which exhaust gas from an engine is guided to be discharged outwardly in the direction shown by an arrow. A coupler 2 is provided on the way of the exhaust gas pipe 1, in which coupler 2 there is provided a braking valve 3 extending slidably across the passageway of the exhaust gas pipe 1. This coupler 2 is connected by of coupler 4 to pneumatic actuator manner that it extends through an inserting opening 7 of the coupler cover 4 and then projects substantially into the cross opening of the coupler 2, so as to be connected operatively to the braking valve 3. When compressed air is introduced into a pressure chamber 8 of the pneumatic actuator 5, a piston 9 is now forced to move downwardly or in the direction shown by an arrow a in FIG. 3 against the resilient force of a spring 10, so that the braking valve 3 may then be put into a closing position as shown by a chain line in FIG. 3.

More specifically, it is known that the inserting opening 7 of the coupler cover 4 and a passing opening 11 for the piston rod 6 of the pneumatic actuator 5 are given a substantial large clearance, respectively. This clearance is provided specifically for allowing the piston rod 6 to expand from the heat of exhaust gas and for accommodating the resistance to sliding motion of the piston rod 6 to be increased from the deposition of carbon or the like contamination of exhaust gas onto the piston rod 6, accordingly. Unfortunately, however, because of such a substantial large clearance given, there is a chance that exhaust gas might well leak onto the side of the pneumatic actuator 5, thus having a seal ring 12 of the piston rod 6 subjected to damages by heat or the like, and thus making durability of this seal ring 12 reduced. In addition, if part of the exhaust gas is allowed to further enter into an atmospheric chamber 13 of the pneumatic actuator 5, the sliding surface of the piston 9 might well be damaged from carbon deposited thereupon, thus causing eventually a malfunction of the piston.

Among others than the above mentioned prior art construction, there are known such as disclosed in the U.S. Pat. Nos. 4,054,156 and 4,205,704 (Japanese Patent Laid-Open Application No. 54,643/1980).

In consideration of such drawbacks particular to the conventional construction of exhaust gas brake systems for use with the automotive vehicle as noted above, it would be desirable to attain an efficient resolution for overcoming such inevitable problems particular to the conventional construction.

The present invention is essentially directed to the provision of a due and proper resolution to such inconveniences and difficulties in practice as outlined above and experienced in the conventional exhaust brake systems which have been left unattended with any proper countermeasures therefor.

SUMMARY OF THE INVENTION

It is therefore a primary object of the present invention to provide an improvement in the construction of an exhaust gas brake system for use with an automotive vehicle whereby there may be attained an efficient effect of preventing exhaust gas from entering onto the side of a pneumatic actuator.

The above object of the invention can be attained as desired from an improved exhaust gas brake system for use with an automotive vehicle, which provide such an advantageous construction and operation of the present inventions (1) and (2) as outlined in the following paragraphs, respectively. (1) An exhaust gas brake system including a coupler member having a braking valve mounted slidably across the exhaust gas pipe, a pneumatic actuator having a piston rod connected operatively to the braking valve, and a coupler cover member disposed between the coupler member and the pneumatic actuator, through which coupler cover member the piston rod extends, which comprise, as summarized in brief, first seal means and second seal means disposed operatively at a predetermined interval in a piston rod passing opening defined in the coupler cover member, the seal means defining a space means therebetween, the space means communicating to the atmosphere.

In operation with the exhaust gas brake system of such construction, the exhaust gas liable to flow to the side of the pneumatic actuator by way of the inserting opening of the coupler cover member may once be held within the space chamber, so as to be discharged to the atmosphere. Consequently, it is advantageous that the seal ring and the guide bushings of the piston rod disposed in the inside of the actuator may be protected from exhaust gas heat or carbon deposited thereupon, thus improving the durability and hence the reliability of the exhaust gas brake system, accordingly.

(2) An exhaust gas brake system including a coupler member having a braking valve mounted slidably across the exhaust gas pipe, a pneumatic actuator having a piston rod connected operatively to the braking valve, and a coupler cover member disposed between the coupler member and the pneumatic actuator, through which coupler cover member the piston rod extends, which comprise, as summarized in brief, first ring means and second ring means disposed in an alternately stacked relationship one upon the other within and along the longitudinal axis of the piston rod passing opening, the first ring means having a relatively small inner circumference clearance and a relatively large outer circumference clearance, the second ring means having a relatively large inner circumference clearance and a relatively small outer circumference clearance, respectively.

In operation with the exhaust gas brake system of such construction, if the exhaust gas tend to flow to the pneumatic actuator, as it is forced to flow in zigzag fashion through the fine gaps defined by and between tdhe first and enter to the side of the pneumatic actuator may be reduced substantially as compared with that in the conventional construction. In addition, carbon that may deposit upon the piston rod is scraped off by the first ring members while passing therethrough, and consequently, the seal ring disposed in the actuator and the guide bushings of the piston rod may be prevented from being worn due to such carbon or the like, thus making the durability of the exhaust gas brake system improved, substantially.

By virtue of the advantageous construction of the invention (1) and (2) with the provision of the space chamber defined around the inner circumference of the piston rod inserting opening of the coupler cover member and communicating with the atmosphere as summarized above, there is obtained such an effect that the exhaust gas liable to flow to the side of the pneumatic actuator by way of the inserting opening of the coupler cover member may temporarily be held within the space chamber, so as to be discharged to the atmosphere. Consequently, it is advantageous that the exhaust gas may be prevented effectively from entering into the pneumatic actuator, and that the seal ring and the guide bushings of the piston rod disposed within the pneumatic actuator may be prevented from being damaged due to heat and carbon from the exhaust gas, thus improving substantially the durability and hence reliability of the exhaust gas brake system, accordingly.

In addition, by virtue of the provision of the first and second ring members disposed alternately along the axis of the piston rod passing opening of the coupler cover member, the seal ring of the piston rod as disposed within the actuator may well be protected from being damaged due to the exhaust gas heat or the like, thus improving the durability and reliability of the seal ring. In addition, carbon deposited upon the piston rod may be scraped off by the first ring members while passing therethrough, thus preventing the guide bushings of the piston rod from being worn with carbon or the like.

Additional features and advantages of the invention will now become more apparent to those skilled in the art upon consideration of the following detailed description of a preferred embodiment exemplifying the best mode of carrying out the invention as presently perceived. The detailed description refers particularly to the accompanying drawings, in which like parts are designated at like reference numerals.

DETAILED DESCRIPTION OF A PREFERRED EMBODIMENT

Figure 1:
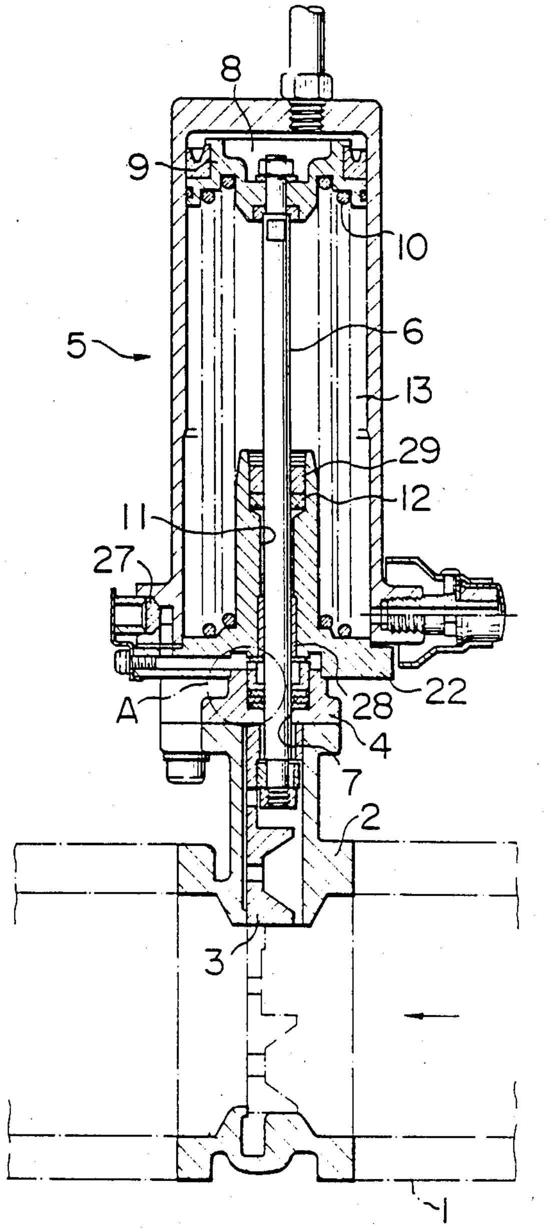
FIG. 1 is a longitudinal cross-sectional view showing the general construction of an exhaust brake system for use in a vehicle by way of a preferred embodiment of the present invention.
Figure 2:
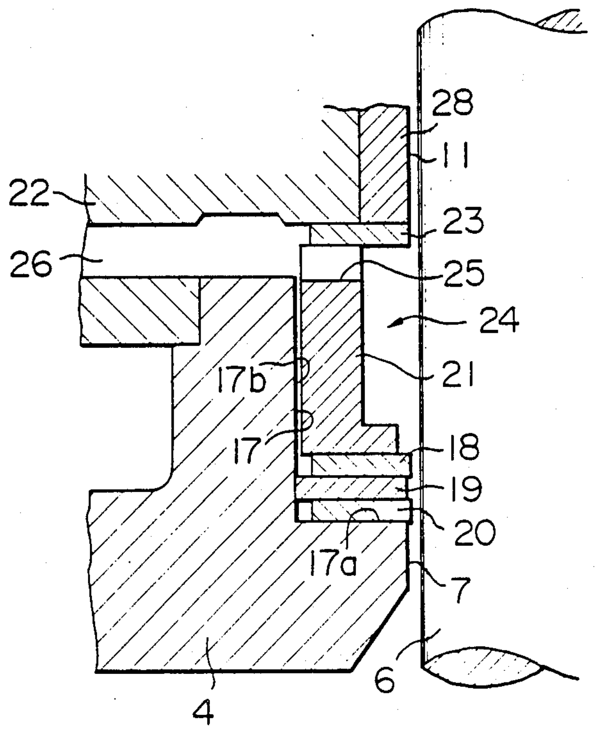
FIG. 2 is an enlarged fragmentary cross-sectional view showing a portion as designated at A in FIG. 1 on an enlarged scale.
Figure 3:
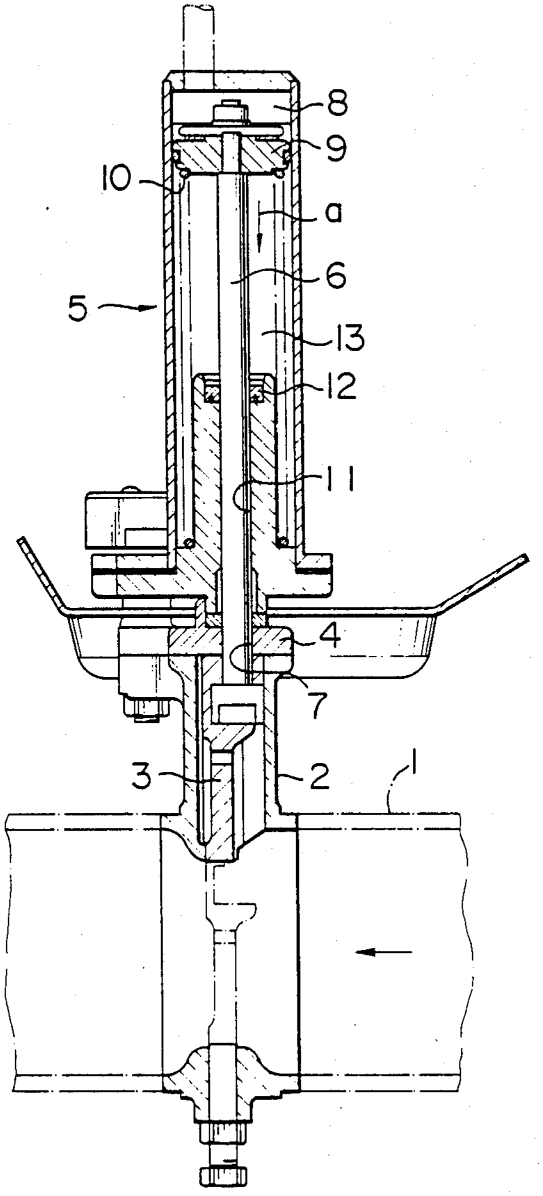
FIG. 3 is a longitudinal cross-sectional view showing the conventional exhaust gas brake system.

The present invention will now be explained in detail by way of a preferred embodiment thereof in conjunction with accompanying drawings herewith. Referring to FIGS. 1 and 2, there is shown in longitudinal cross-section the general construction of an exhaust gas brake system, in which there is seen provided a coupler cover member 4 having a through opening 7 defined in the center thereof, and having an annular step 17 defined in the inner circumference of the inserting opening 7. Upon the bottom wall 17*a* of the annular step 17, there are disposed three pieces of ring-like members 18, 19, 20 of stainless steel stacked one upon the other, which serve as a first stage of sealing means. Upon these stacked ring members 18, 19, 20, there is a cylindrical spacer 21 abutting, and between the upper end of this spacer 21 and the lower end member 22 of the pneumatic actuator 5, there is seen provided another ring-like member 23, which serves as a second sealing means.

There is defined an annular spacing or space chamber 24 between the inner circumference of the spacer 21 and the outer circumference of the piston rod 6, this space chamber 24 being adapted to communicate with the atmosphere by way of a plurality of slots 25 defined in the upper end face of the spacer 21, a passage 26 and a filter 27.

Referring more specifically to these three pieces of ring members 18, 19, 20, it is seen that the first or top ring member 18 and the last or bottom ring member 20 are the same member serving as the first ring member as referred to above, while the second or middle-ring member 19 is the other serving as the second ring member. These ring members are provided with different inner and outer diameters from each other in such a manner that the first ring members 18, 20 has a relatively small inner and outer diameters, while the second ring member 19 is designed with a relatively large inner and outer diameters. More specifically, the inner circumference clearance of the first ring members 18, 20 with respect to the piston rods is designed to be relatively small, while the outer circumference clearance thereof with respect to the side wall 17*b* of the annular step 17 is relatively large. On the other hand, the second ring member 19 has a relatively large inner circumference clearance, but has relatively small outer circumference clearance.

For instance, the first ring members 18, 20 may have an inner circumference clearance ranging from 0.05 to 0.13 mm and an outer circumference clearance of approximately 2 mm, while the second ring member 19 may have an inner circumference clearance of approx. 2 mm and an outer circumference clearance ranging from 0.02 to 0.08 mm. On the other hand, the ring member 23 as disposed upon the upper end of the spacer 21 may be of a similar shape to that of the first ring member 18, 20.

It is to be noted that the spacer 21 is put to rest in position between the group of ring members 18, 19, 20 and the ring member 23 in such a manner that the first ring members 18, 20 and the ring member 23 may play slightly in the radial direction with respect to each other.

With such a unique construction of the exhaust gas brake system according to the present invention, when compressed air is introduced into the pressure chamber 8 of the pneumatic actuator 5, the piston 9 may be forced downwardly as viewed in FIG. 1 under pressure of this compressed air, so that the exhaust gas pipe 1 is caused to be closed by the braking valve 3 as shown by a chain line, thus performing an effect of engine compression brake. At this moment, as the exhaust gas existing in the upstream of the braking valve 3 gains increased pressure, it will rise higher through the coupler 2, and then may tend to enter to the side of the pneumatic actuator 5 by way of the inserting opening 7 of the coupler cover 4. However, by virtue of the relatively small inner circumference clearance of the first ring members 18, 20 disposed in the inserting opening 7, the exhaust gas may be forced to pass in a zigzag fashion through the fine gaps defined by and between the first ring members 18, 20 and the second ring member 19, instead of passing straight along the piston rod 6. For this reason, only a small quantity of exhaust gas may pass over to the space chamber 24.

This small quantity of exhaust gas leaked into the space chamber 24 would then tend to enter into the passing opening 11 in the lower end member 22 of the pneumatic actuator 5. However, since there is provided the ring member 23 which is of the same type as the first ring members 18, 20 at the entrance of the passing opening 11, the exhaust gas may effectively be prevented from entering there. On the other hand, as the space chamber 24 is designed communicating to the atmosphere by way of the passage 26, the exhaust gas existing in the space chamber 24 may then be discharged smoothly by using the passage 26 and the filter 27.

In addition to the effect that the first ring members 18, 20 and the ring member 23 may similarly serve to block the flow of exhaust gas as reviewed hereinbefore, they can afford to scrape off carbon or the like contamination as deposited upon the piston rod 6, thus contributing to an improvement in the durability of the pneumatic actuator, accordingly. Reviewing more specifically, since the piston rod 6 is subjected at its leading end to the exhaust gas, there is a higher possibility of carbon deposition on its outer circumference, and if this carbon would be burnt to this area, it would be very possible that the piston rod 6 may get seized upon the guide bushings 28, 29 disposed in the passing opening 11 defined in the lower end member 22 of the pneumatic actuator 5, thus bringing a cause of malfunction of the system. However, by virtue of the unique construction of the exhaust gas brake system according to the present invention, carbon deposited upon the piston rod 6 would be scraped off before being seized by heat, while the piston rod 6 passes in reciprocating motion, by the first ring members 18, 20, which may then serve to eliminate the possibility of seizure between the guide bushings 28, 29 and the piston rod 6, accordingly.

On the other hand, in consideration that the first ring members 18, 20 and the ring member 23 are designed with the substantially small inner circumference clearance with respect to the piston rod 6 to such an extent that these ring members may play in the radial direction, if and when the piston rod 6 may swing within the allowance of clearance to the inserting openings 7 and 11 or the guide bushings 28, 29, there is no risk of interference or frictional resistance occurring between the piston rod 6 and these ring members 18, 20 and 23, thus ensuring a smooth reciprocating motion of the piston rod 6 during the operation, accordingly.

While the invention is described by way of a specific embodiment thereof, it is to be understood that the invention may be embodied in various ways without being restricted to this specific embodiment thereof, but many other modifications may be made without departing from the spirit of the invention. For instance, while there are provided two pieces of the first ring members 18, 20, between which there is disposed one piece of second ring member 19 in this specific embodiment, it is of course possible in practice that these members may be provided in a desired quantity as the case may be, within the teachings of the invention. Also, while the coupler member 2 and the coupler cover member 4 are provided separately, it is of course feasible to provide such members in one-piece structure.

It is also to be understood that the appended claims are intended to cover all of such generic and specific features particular to the invention as disclosed herein and all statements relating to the scope of the invention, which as a matter of language might be said to fall thereunder.

What is claimed is:

1. An exhaust gas brake assembly including a coupler member mounted on an exhaust gas pipe of a vehicle, the coupler member housing a braking valve mounted for reciprocal sliding movement across the exhaust gas pipe, a pneumatic actuator having a piston rod connected operatively to the braking valve, a coupler cover member disposed between the coupler member and the pneumatic actuator, the coupler cover member being formed with an aperture defined by a cylindrical wall portion through which the piston rod extends; and, sealing means which comprises, in combination, a first hard ring member and a second hard ring member disposed alternately in closely stacked relation one upon the other within and along the longitudinal axis of the piston rod receiving opening, said first ring member having an axially thin, circumferentially extending, inner scraping edge defining with the piston rod a relatively small inner circumferential clearance and a relatively large outer circumferential clearance with the wall of the aperture, said second hard ring member defining a relatively large inner circumferential clearance with the piston rod and a relatively small outer circumferential clearance with the wall of the aperture, whereby the first hard ring member scrapes carbon deposits from the piston rod during reciprocation thereof and an exhaust gas expansion space is defined between the first and second hard ring members and the piston rod for expansion of exhaust gas leaking from the exhaust gas pipe between the inner circumference of the first hard ring means and the piston rod during the operation of the brake.

2. An exhaust gas brake assembly as claimed in claim 1, wherein said first hard ring member is mounted for sliding movement across the second hard ring member so that the first hard ring member can be shifted in the radial direction by engagement with the piston rod during movement thereof.

3. An exhaust gas brake assembly including a coupler member mounted on an exhaust gas pipe of a vehicle, the coupler member housing a braking valve mounted for reciprocal sliding movement across the exhaust gas pipe, a pneumatic actuator having a piston rod connected operatively to the braking valve, a coupler cover member disposed between the coupler member and the pneumatic actuator, the coupler cover member being formed with an aperture defined by a cylindrical wall portion through which the piston rod extends; and, sealing means which comprises, in combination, a first hard ring member and a second hard ring member disposed alternately in closedly stacked relation one upon the other within and along the longitudinal axis of the piston rod receiving opening, said first ring member having an axially thin, circumferentially extending inner scraping edge defining with the piston rod a relatively small inner circumferential clearance and a relatively largle outer circumference clearance with the wall of the aperture, said second hard ring member defining a relatively large inner circumferential clearance with the piston rod and a relatively small outer circumferential clearance with the wall of the aperture, whereby the first hard ring member scrapes carbon deposits from the piston rod during reciprocation thereof, and an exhaust gas expansion space is defined between the first and second hard ring members and the piston rod for expansion of exhaust gas leaking from the exhaust gas pipe between the inner circumference of the first hard ring means and the piston rod during the operation of the brake, a further sealing means being located in the piston rod receiving aperture axially spaced from said first sealing means and defining therebetween a venting chamber and means connecting said venting chamber to the atmosphere.

4. An exhaust gas break assembly as claimed in claim 3, wherein said first hard ring member is mounted for sliding movement across the second hard ring member so that the first hard ring member can be shifted in the radial direction by engagement with the piston rod during movement thereof.

5. An exhaust gas brake assembly including a coupler member mounted on an exhaust gas pipe of a vehicle, the coupler member housing a braking valve mounted for reciprocal sliding movement across the exhaust gas pipe, a pneumatic actuator having a piston rod connected operatively to the braking valve, a coupler cover member disposed between the coupler member and the pneumatic actuator, the coupler cover member being formed with an aperture forming a piston rod receiving opening defined by a cylindrica wall portion through which the piston rod extends; and, sealing means which comprise a hard ring member having an axially thin, circumferentially extending, inner scraping edge movably mounted in the piston rod receiving opening defining a relatively small inner circumferential clearance with the piston rod for scraping carbon deposits therefrom and defining a relatively large outer circumferential clearance with the cylindrical wall portion of the piston rod receiving opening for the accommodiation of movement of the ring member between the piston rod and the cylindrical wall portion in the radial direction by engagement with the piston rod during reciprocation thereof for scraping certain deposits from the piston rod.

6. An exhaust gas brake asssembly as claimed in claim 5 wherein a venting chamber for exhaust gas leaking past the hard ring member is provided in the coupler member downstream of the sealing ring.

7. An exhaust gas brake assembly according to claim 6 wherein a second hard ring member similar to the first hard ring member is mounted in the piston rod receiving opening defining a relatively small inner circumferential clearance with the piston rod and, a relatively larage circummferential clearance with the piston wall of the piston rod receiving opening and a further hard ring member is mounted in the piston rod receiving opening defining a relatively large inner circumferential clearance with the piston rod and a relatively small outer circumferential clearance with the wall of the piston rod receiving opening axially between the first and second hard ring members and in sliding engagement therewith so that an annular expansion space for exhaust gas leaking past the first hard ring member is defined between the first and further hard ring members and between the inner circumference of the second hard ring member and the piston rod.

* * * * *